United States Patent
You et al.

(10) Patent No.: US 10,893,541 B2
(45) Date of Patent: Jan. 12, 2021

(54) CLEAR CHANNEL ASSESMENT (CCA) IN UNLICENSED WIRELESS SPECTRUM

(71) Applicant: HUAWEI TECHNOLOGIES CO., LTD., Shenzhen (CN)

(72) Inventors: Chunhua You, Shanghai (CN); Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/047,017

(22) Filed: Jul. 27, 2018

(65) Prior Publication Data
US 2018/0376512 A1    Dec. 27, 2018

Related U.S. Application Data

(63) Continuation of application No. PCT/CN2016/072717, filed on Jan. 29, 2016.

(51) Int. Cl.
*H04W 74/08*   (2009.01)
*H04W 16/14*   (2009.01)
(Continued)

(52) U.S. Cl.
CPC ....... *H04W 74/0833* (2013.01); *H04L 5/0048* (2013.01); *H04L 5/0053* (2013.01);
(Continued)

(58) Field of Classification Search
CPC ........... H04W 74/0833; H04W 74/006; H04W 16/14; H04W 72/0413; H04W 76/27;
(Continued)

(56) References Cited

U.S. PATENT DOCUMENTS 8,917,686 B2 * 12/2014 Lee ............... H04W 74/0866
370/329
9,473,981 B2 * 10/2016 Bhushan ........... H04W 72/0413
(Continued)

FOREIGN PATENT DOCUMENTS

| CN | 103517343 A | 1/2014 |
| CN | 104380780 A | 2/2015 |
| CN | 104540164 A | 4/2015 |

OTHER PUBLICATIONS

U.S. Appl. No. 62/250,232, filed Nov. 3, 2015 (Year: 2015).*
(Continued)

*Primary Examiner* — Ian N Moore
*Assistant Examiner* — Rushil Parimal Sampat
(74) *Attorney, Agent, or Firm* — Kilpatrick Townsend & Stockton LLP

(57) ABSTRACT

The present invention discloses an uplink transmission method, a base station, and a terminal device, to implement uplink multiuser scheduling and multiuser resource multiplexing, and save resources. The method in embodiments of the present invention includes: obtaining, by a base station, first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user; and sending, by the base station, the first configuration information and the instruction information to the terminal device, so that the terminal device sends the channel occupancy indication signal based on the first configuration information and the instruction information.

12 Claims, 6 Drawing Sheets

(51) Int. Cl.
*H04W 74/00* (2009.01)
*H04W 76/27* (2018.01)
*H04L 5/00* (2006.01)
*H04W 72/04* (2009.01)

(52) U.S. Cl.
CPC ....... *H04W 16/14* (2013.01); *H04W 72/0413* (2013.01); *H04W 74/006* (2013.01); *H04W 76/27* (2018.02); *H04W 72/0486* (2013.01)

(58) Field of Classification Search
CPC . H04W 72/0486; H04L 5/0053; H04L 5/0048
See application file for complete search history.

(56) References Cited

U.S. PATENT DOCUMENTS

| | | |
|---|---|---|
| 10,455,504 B2* | 10/2019 | Li ............................. H04L 5/14 |
| 2013/0301542 A1 | 11/2013 | Krishnamurthy et al. |
| 2014/0079015 A1 | 3/2014 | Kim et al. |
| 2014/0362780 A1 | 12/2014 | Malladi et al. |
| 2015/0181589 A1 | 6/2015 | Luo et al. |
| 2015/0264717 A1 | 9/2015 | Harel et al. |
| 2018/0332576 A1* | 11/2018 | Oh ......................... H04W 16/14 |

OTHER PUBLICATIONS

R1-160297 Huawei et al.,"Analysis on LBT with category 2 and 4 for eLAA",3GPP TSG RAN WG1 Meeting #84,St. Julians, Malta, Feb. 15-19, 2016,total 6 pages.

R1-160280 Huawei et al.,"UL LBT to enable UE multiplexing of uplink transmissions",3GPP TSG RAN WG1 Meeting #84,St. Julians, Malta, Feb. 15-19, 2016,total 6 pages.

R1-164072 Huawei et al.,"UL category 4 LBT with eNB assistance",3GPP TSG RAN WG1 Meeting #85,Nanjing, China, May 23-27, 2016,total 6 pages.

R1-156858 LG Electronics,"UL LBT design in LAA",3GPP TSG RAN WG1 Meeting #83,Anaheim, USA, Nov. 15-22, 2015,total 6 pages.

R1-156768 Samsung,"Discussion on LBT for UL transmission",3GPP TSG RAN WG1 Meeting #83,Anaheim, USA, Nov. 15-22, 2015,total 6 pages.

R1-154574 Alcatel-Lucent et al.,"UL LBT and DL/UL Frame Structure for LAA",3GPP TSG RAN WG1 Meeting #82, Beijing, China, Aug. 25-28, 2015, total 6 pages.

R2-152219 Huawei et al.,"Analysis of LBT Operation for LAA Uplink",3GPP TSG-RAN WG2 Meeting #90,Fukuoka, Japan, May 25-29, 2015, total 6 pages.

* cited by examiner

CLEAR CHANNEL ASSESMENT (CCA) IN UNLICENSED WIRELESS SPECTRUM

CROSS-REFERENCE TO RELATED APPLICATIONS

This application is a continuation of International Application No. PCT/CN2016/072717, filed on Jan. 29, 2016, the disclosure of which is hereby incorporated by reference in its entirety.

TECHNICAL FIELD

The present invention relates to the field of communications technologies, and in particular, to an uplink transmission method, a base station, and a terminal device.

BACKGROUND

To resist multipath interference and reduce intersymbol interference, a cyclic prefix (English full name: Cyclic prefix, CP for short) is introduced to Long Term Evolution (English full name: Long Term Evolution, LTE for short). It needs to be ensured that data sent by all terminal devices in an orthogonal frequency division multiplexing (English full name: Orthogonal Frequency Division multiplexing, OFDM for short) symbol is within a CP range when arriving at a base station. Otherwise, the base station cannot successfully demodulate the data. In an unlicensed spectrum cell and/or a cell on which clear channel assessment (English full name: Clear Channel Assessment, CCA for short) detection needs to be performed before data sending, a listen before talk (English full name: Listen before talk, LBT for short) process needs to be complete before the base station sends downlink data or the terminal device sends uplink data. If the LBT is successful, the data is successfully sent; otherwise, the data cannot be sent. The so-called LBT process is that CCA detection needs to be performed before a base station or a terminal device sends data. If detected energy is less than a specific threshold, a channel is considered as idle, and the data can be sent. Otherwise, the channel is considered as busy, and the data cannot be sent.

Currently, in an unlicensed spectrum cell and/or a cell on which CCA detection needs to be performed before data sending, data is usually sent by using Wireless Fidelity (English full name: Wireless Fidelity, WIFI for short), and a channel is used by one terminal device at a time.

However, channel resources of fixed bandwidths are preempted in the LBT process, and an LBT mechanism automatically determines that these channel resources can be occupied only by one node. However, LTE is based on multiuser scheduling. Each time a subframe is scheduled, a plurality of UEs are scheduled in this subframe. Apparently, in the existing solution, a base station cannot perform simultaneous uplink multiuser scheduling and multiuser resource multiplexing. In addition, the terminal device in the existing solution cannot start or continue an LBT process until sending of data in a previous subframe is complete, and the LBT process requires a longer time than a CP length. Consequently, the base station cannot successfully demodulate the data, and data in one timeslot is wasted. One timeslot includes six or seven symbols. Therefore, the existing solution cannot implement uplink multiuser scheduling and multiuser resource multiplexing, and a problem of a waste of resources exists.

SUMMARY

Embodiments of the present invention provide an uplink transmission method, a base station, and a terminal device, to implement uplink multiuser scheduling and multiuser resource multiplexing, and save resources.

In view of this, a first aspect of the present invention provides an uplink transmission method, including:

obtaining, by a base station, first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user; and sending, by the base station, the first configuration information and the instruction information to the terminal device, so that the terminal device sends the channel occupancy indication signal based on the first configuration information and the instruction information.

The first configuration information may be configured by the base station, or may be specified by a communications protocol. The instruction information may be instructed by the base station, or may be specified by a communications protocol. The terminal device includes one terminal device or a plurality of terminal devices in a cell served by the base station.

Beneficial effects are as follows: The uplink data may be uplink data sent by a plurality of terminal devices, so that uplink multiuser scheduling is implemented. The channel occupancy indication signal is used to indicate that the current channel belongs to the radio access technology user, and a receiver of the channel occupancy indication signal performs resource multiplexing, so that multiuser resource multiplexing is implemented. Duration of a time configured in the channel contention configuration information may be far less than duration of one timeslot, so that resources are saved.

With reference to the first aspect of the present invention, in a first implementation of the first aspect of the present invention, the method further includes:

sending, by the base station, second configuration information to the terminal device, where the second configuration information is configuration information of the channel occupancy indication signal.

With reference to the first implementation of the first aspect of the present invention, in a second implementation of the first aspect of the present invention, the sending, by the base station, second configuration information to the terminal device includes:

sending, by the base station, the second configuration information to the terminal device in a unicast manner by using a radio resource control layer RRC message; or sending, by the base station, the second configuration information to the terminal device in a broadcast manner by using a radio resource control layer RRC message.

Beneficial effects are as follows: A plurality of methods for sending the second configuration information are provided, so that the technical solutions of the present invention are improved.

With reference to the second implementation of the first aspect of the present invention, in a third implementation of the first aspect of the present invention, the first configuration information includes duration information and time domain location information of a channel contention time, the instruction information includes information that instructs the base station to select the terminal device from a cell served by the base station as a terminal device that sends the channel occupancy indication signal, and the second configuration information includes reference signal sequence information and bandwidth information of the channel occupancy indication signal.

Beneficial effects are as follows: Content of the present invention is more readable by specifying the first configuration information, the instruction information, and the second configuration information.

With reference to the first aspect of the present invention, in a fourth implementation of the first aspect of the present invention, the sending, by the base station, the first configuration information and the instruction information to the terminal device includes:

sending, by the base station, duration information of a channel contention time in the first configuration information to the terminal device in a unicast or broadcast manner by using the RRC message, and sending time domain location information of the channel contention time in the first configuration information and the instruction information to the terminal device in a unicast or broadcast manner by using a physical layer message; or sending, by the base station, duration information and time domain location information of a channel contention time in the first configuration information to the terminal device in a unicast or broadcast manner by using the RRC message, and sending the instruction information to the terminal device in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

The time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes.

In a time domain, the uplink resource carrying the uplink data occupies duration of one or more symbols.

With reference to the first aspect of the present invention, the first implementation of the first aspect of the present invention, the second implementation of the first aspect of the present invention, the third implementation of the first aspect of the present invention, or the fourth implementation of the first aspect of the present invention, in a fifth implementation of the first aspect of the present invention, after the sending, by the base station, the first configuration information and the instruction information to the terminal device, the method includes:

determining, by the base station, a receiver of the channel occupancy indication signal; and sending, by the base station, a notification message to the receiver of the channel occupancy indication signal, where the notification message includes at least one of information about a distance between the terminal device and the receiver, information about coordinates of a location of the terminal device, or timing advance TA information.

With reference to the first aspect of the present invention, the first implementation of the first aspect of the present invention, the second implementation of the first aspect of the present invention, the third implementation of the first aspect of the present invention, the fourth implementation of the first aspect of the present invention, or the fifth implementation of the first aspect of the present invention, in a sixth implementation of the first aspect of the present invention, the method further includes:

allocating, by the base station, a time-frequency resource to a plurality of terminal devices, where duration corresponding to the time-frequency resource is preset duration of a longest channel occupancy time; and determining, by the base station, the longest channel occupancy time by using an allocated channel time occupied by the plurality of terminal devices; or allocating, by the base station, a time-frequency resource to a reference terminal device in a plurality of terminal devices, where a terminal device other than the reference terminal device in the plurality of terminal devices performs resource multiplexing on an allocated channel resource occupied by the reference terminal device, and duration corresponding to the time-frequency resource is preset duration of a longest channel occupancy time; and determining, by the base station, the longest channel occupancy time by using a channel time occupied by the reference terminal device.

Beneficial effects are as follows: Two methods for determining the longest channel occupancy time are provided, so that the technical solutions of the present invention are further improved.

In view of this, a second aspect of the present invention provides an uplink transmission method, including:

receiving, by a terminal device, first configuration information and instruction information that are sent by a base station, where the first configuration information and the instruction information are information obtained by the base station, the first configuration information is channel contention configuration information before uplink data is sent, the instruction information is information that instructs the terminal device to send a channel occupancy indication signal, and the channel occupancy indication signal is used to indicate that a current channel belongs to a radio access technology user; and sending, by the terminal device, the channel occupancy indication signal based on the first configuration information and the instruction information.

Beneficial effects are as follows: The terminal device sends the channel occupancy indication signal to indicate that the current channel belongs to an LTE user, so that an Institute of Electrical and Electronics Engineers (English full name: Institute of Electrical and Electronics Engineers, IEEE for short) 802.11n/11ac user is prevented from preempting a right of use of the channel.

With reference to the second aspect of the present invention, in a first implementation of the second aspect of the present invention, the method further includes:

receiving, by the terminal device, second configuration information sent by the base station, where the second configuration information is configuration information of the channel occupancy indication signal.

With reference to the first implementation of the second aspect of the present invention, in a second implementation of the second aspect of the present invention, the receiving, by the terminal device, second configuration information sent by the base station includes:

receiving, by the terminal device, the second configuration information sent by the base station in a unicast manner by using a radio resource control layer RRC message; or receiving, by the terminal device, the second configuration information sent by the base station in a broadcast manner by using a radio resource control layer RRC message.

With reference to the second implementation of the second aspect of the present invention, in a third implementation of the second aspect of the present invention, the first configuration information includes duration information and time domain location information of a channel contention time, the instruction information includes information that instructs the base station to select the terminal device from a cell served by the base station as a terminal device that sends the channel occupancy indication signal, and the second configuration information includes reference signal sequence information and bandwidth information of the channel occupancy indication signal.

With reference to the second aspect of the present invention, in a fourth implementation of the second aspect of the present invention, the receiving, by a terminal device, first configuration information and instruction information that are sent by a base station includes:

receiving, by the terminal device, duration information that is of a channel contention time in the first configuration information and that is sent by the base station in a unicast or broadcast manner by using the RRC message, and receiving time domain location information of the channel contention time in the first configuration information and the instruction information that are sent by the base station in a unicast or broadcast manner by using a physical layer message; or receiving, by the terminal device, duration information and time domain location information that are of a channel contention time in the first configuration information and that are sent by the base station in a unicast or broadcast manner by using the RRC message, and receiving the instruction information sent by the base station in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

The time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes.

In a time domain, the uplink resource carrying the uplink data occupies duration of one or more symbols.

In view of this, a third aspect of the present invention provides a base station, including:

an obtaining module, configured to obtain first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user; and a first sending module, configured to send the first configuration information and the instruction information to the terminal device, so that the terminal device sends the channel occupancy indication signal based on the first configuration information and the instruction information.

The first configuration information may be configured by the base station, or may be specified by a communications protocol. The instruction information may be instructed by the base station, or may be specified by a communications protocol. The terminal device includes one terminal device or a plurality of terminal devices in a cell served by the base station.

Beneficial effects are as follows: The uplink data may be uplink data sent by a plurality of terminal devices, so that uplink multiuser scheduling is implemented. The channel occupancy indication signal is used to indicate that the current channel belongs to the radio access technology user, and a receiver of the channel occupancy indication signal performs resource multiplexing, so that multiuser resource multiplexing is implemented. Duration of a time configured in the channel contention configuration information may be far less than duration of one timeslot, so that resources are saved.

With reference to the third aspect of the present invention, in a first implementation of the third aspect of the present invention, the base station further includes:

a second sending module, configured to send second configuration information to the terminal device, where the second configuration information is configuration information of the channel occupancy indication signal.

With reference to the first implementation of the third aspect of the present invention, in a second implementation of the third aspect of the present invention, the second sending module is specifically configured to send the second configuration information to the terminal device in a unicast manner by using a radio resource control layer RRC message, or send the second configuration information to the terminal device in a broadcast manner by using a radio resource control layer RRC message.

With reference to the second implementation of the third aspect of the present invention, in a third implementation of the third aspect of the present invention, the first configuration information includes duration information and time domain location information of a channel contention time, the instruction information includes information that instructs the base station to select the terminal device from a cell served by the base station as a terminal device that sends the channel occupancy indication signal, and the second configuration information includes reference signal sequence information and bandwidth information of the channel occupancy indication signal.

Beneficial effects are as follows: Content of the present invention is more readable by specifying the first configuration information, the instruction information, and the second configuration information.

With reference to the third aspect of the present invention, in a fourth implementation of the third aspect of the present invention, the first sending module is specifically configured to: send duration information of a channel contention time in the first configuration information to the terminal device in a unicast or broadcast manner by using the RRC message, and send time domain location information of the channel contention time in the first configuration information and the instruction information to the terminal device in a unicast or broadcast manner by using a physical layer message; or send duration information and time domain location information of a channel contention time in the first configuration information to the terminal device in a unicast or broadcast manner by using the RRC message, and send the instruction information to the terminal device in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

The time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes.

In a time domain, the uplink resource carrying the uplink data occupies duration of one or more symbols.

With reference to the third aspect of the present invention, the first implementation of the third aspect of the present invention, the second implementation of the third aspect of the present invention, the third implementation of the third aspect of the present invention, or the fourth implementation of the third aspect of the present invention, in a fifth implementation of the third aspect of the present invention, the base station further includes:

a first determining module, configured to determine a receiver of the channel occupancy indication signal; and a third sending module, configured to send a notification message to the receiver of the channel occupancy indication signal, where the notification message includes at least one of information about a distance between the terminal device and the receiver, information about coordinates of a location of the terminal device, or timing advance TA information.

With reference to the third aspect of the present invention, the first implementation of the third aspect of the present invention, the second implementation of the third aspect of the present invention, the third implementation of the third aspect of the present invention, the fourth implementation of the third aspect of the present invention, or the fifth implementation of the third aspect of the present invention, in a sixth implementation of the third aspect of the present invention, the base station further includes:

a first allocation module, configured to allocate a time-frequency resource to a plurality of terminal devices, where duration corresponding to the time-frequency resource is preset duration of a longest channel occupancy time; and a second determining module, configured to determine the longest channel occupancy time by using an allocated channel time occupied by the plurality of terminal devices; or a second allocation module, configured to allocate a time-frequency resource to a reference terminal device in a plurality of terminal devices, where a terminal device other than the reference terminal device in the plurality of terminal devices performs resource multiplexing on an allocated channel resource occupied by the reference terminal device, and duration corresponding to the time-frequency resource is preset duration of a longest channel occupancy time; and a third determining module, configured to determine the longest channel occupancy time by using a channel time occupied by the reference terminal device.

In view of this, a fourth aspect of the present invention provides a terminal device, including:

a first receiving module, configured to receive first configuration information and instruction information that are sent by a base station, where the first configuration information and the instruction information are information obtained by the base station, the first configuration information is channel contention configuration information before uplink data is sent, the instruction information is information that instructs the terminal device to send a channel occupancy indication signal, and the channel occupancy indication signal is used to indicate that a current channel belongs to a radio access technology user; and a sending module, configured to send the channel occupancy indication signal based on the first configuration information and the instruction information.

Beneficial effects are as follows: The sending module sends the channel occupancy indication signal to indicate that the current channel belongs to an LTE user, so that an IEEE 802.11n/11ac user is prevented from preempting a right of use of the channel.

With reference to the fourth aspect of the present invention, in a first implementation of the fourth aspect of the present invention, the terminal device further includes:

a second receiving module, configured to receive second configuration information sent by the base station, where the second configuration information is configuration information of the channel occupancy indication signal.

With reference to the first implementation of the first aspect of the present invention, in a second implementation of the first aspect of the present invention, the second receiving module is specifically configured to receive the second configuration information sent by the base station in a unicast manner by using a radio resource control layer RRC message, or receive the second configuration information sent by the base station in a broadcast manner by using a radio resource control layer RRC message.

With reference to the second implementation of the fourth aspect of the present invention, in a third implementation of the fourth aspect of the present invention, the first configuration information includes duration information and time domain location information of a channel contention time, the instruction information includes information that instructs the base station to select the terminal device from a cell served by the base station as a terminal device that sends the channel occupancy indication signal, and the second configuration information includes reference signal sequence information and bandwidth information of the channel occupancy indication signal.

With reference to the fourth aspect of the present invention, in a fourth implementation of the fourth aspect of the present invention, the first receiving module is specifically configured to: receive duration information that is of a channel contention time in the first configuration information and that is sent by the base station in a unicast or broadcast manner by using the RRC message, and receive time domain location information of the channel contention time in the first configuration information and the instruction information that are sent by the base station in a unicast or broadcast manner by using a physical layer message; or receive duration information and time domain location information that are of a channel contention time in the first configuration information and that are sent by the base station in a unicast or broadcast manner by using the RRC message, and receive the instruction information sent by the base station in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

The time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes.

In a time domain, the uplink resource carrying the uplink data occupies duration of one or more symbols.

Compared with the prior art, the uplink data in the present invention may be uplink data sent by a plurality of terminal devices, so that uplink multiuser scheduling is implemented. The channel occupancy indication signal is used to indicate that the current channel belongs to the radio access technology user, and the receiver of the channel occupancy indication signal performs resource multiplexing, so that multiuser resource multiplexing is implemented. Duration of a time configured in the channel contention configuration information may be far less than duration of one timeslot, so that resources are saved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
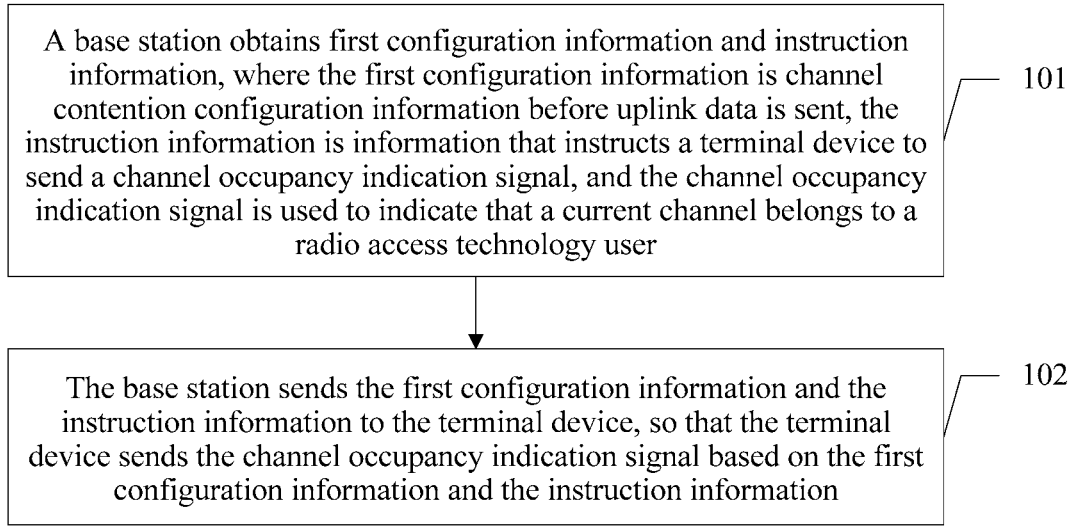
FIG. 1 is a schematic diagram of an embodiment of an uplink transmission method according to embodiments of the present invention.

Embodiments of the present invention provide an uplink transmission method, a base station, and a terminal device, to implement uplink multiuser scheduling and multiuser resource multiplexing, and save resources.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other units not expressly listed or inherent to such a process, method, product, or device.

The present invention is mainly applied to an unlicensed spectrum cell and/or a cell on which CCA detection needs to be performed before data sending. The cell on which CCA detection needs to be performed before sending data may be a licensed spectrum cell, or may be an unlicensed spectrum cell. Certainly, the present invention may also be applied to a normal time interval (English full name: Transmission Time Interval, TTI for short) system, a short TTI system, or a mixed TTI system.

A terminal device in the embodiments of the present invention may be a device that provides a user with voice and/or data connectivity, a handheld device that has a wireless connection function, or another processing device connected to a wireless modem. The wireless terminal may communicate with one or more core networks by using a radio access network (Radio Access Network, RAN). The wireless terminal may be a mobile terminal such as a mobile phone (or referred to as a "cellular" phone), or a computer having a mobile terminal. For example, the wireless terminal may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A base station in the embodiments of the present invention may be configured to perform conversion between a received over-the-air frame and an IP packet, and serve as a router between the wireless terminal and the rest of the access network. The rest of the access network may include an Internet Protocol (IP) network. The base station may further coordinate attribute management of an air interface. For example, the base station may be a base transceiver station (BTS, Base Transceiver Station) in GSM or CDMA, may be a NodeB (NodeB) in WCDMA, and may further be an evolved NodeB (eNB or e-NodeB, evolved NodeB) in LTE, and this is not limited in this application.

An uplink transmission method in the present invention is described below with reference to specific embodiments.

Referring to FIG. 1, an embodiment of an uplink transmission method in the embodiments of the present invention includes the following steps.

101. A base station obtains first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user.

In this embodiment, the first configuration information may be configured by the base station, or may be specified by a communications protocol. The instruction information may be instructed by the base station, or may be specified by a communications protocol. The terminal device may include one terminal device or a plurality of terminal devices in a cell served by the base station, or may include one terminal device or a plurality of terminal devices in a terminal device list, or may include all terminal devices in a terminal device list. The base station may select one or more terminal devices to send the channel occupancy indication signal.

The uplink data in the present invention includes at least one of physical random access channel (English full name: Physical Random Access Channel, PRACH for short) data, physical uplink control channel (English full name: Physical Uplink Control Channel, PUCCH for short) data, physical uplink shared channel (English full name: Physical Uplink Shared Channel, PUSCH for short) data, or a sounding reference signal (English full name: Sounding Reference Signal, SRS for short).

102. The base station sends the first configuration information and the instruction information to the terminal device, so that the terminal device sends the channel occupancy indication signal based on the first configuration information and the instruction information.

In this embodiment, after the base station obtains the first configuration information and the instruction information, the base station sends the first configuration information and the instruction information to the terminal device. After the terminal device receives the first configuration information and the instruction information, the terminal device sends the channel occupancy indication signal based on the first configuration information and the instruction information.

It should be noted that the first configuration information and the instruction information may be sent by using a same message, or may be sent by using different messages.

In this embodiment, the uplink data may be uplink data sent by a plurality of terminal devices, so that uplink multiuser scheduling is implemented. The channel occupancy indication signal is used to indicate that the current channel belongs to the radio access technology user, and a receiver of the channel occupancy indication signal performs resource multiplexing, so that multiuser resource multiplexing is implemented. Duration of a time configured in the channel contention configuration information may be far less than duration of one timeslot, so that resources are saved.

Optionally, after the base station sends the first configuration information and the instruction information to the terminal device, the method includes:

determining, by the base station, a receiver of the channel occupancy indication signal; and sending, by the base station, a notification message to the receiver of the channel occupancy indication signal, where the notification message includes at least one of information about a distance between the terminal device and the receiver, information about coordinates of a location of the terminal device, or timing advance TA information. As a result, the receiver more accurately identifies the channel occupancy indication signal.

It should be noted that the terminal device may send information about the receiver of the channel occupancy indication signal to the base station, so that the base station determines the receiver of the channel occupancy indication signal.

Optionally, the method further includes: allocating, by the base station, a time-frequency resource to a plurality of terminal devices, where duration corresponding to the time-frequency resource is preset duration of a longest channel occupancy time; and determining, by the base station, the longest channel occupancy time by using an allocated channel time occupied by the plurality of terminal devices; or allocating, by the base station, a time-frequency resource to a reference terminal device in a plurality of terminal devices, where a terminal device other than the reference terminal device in the plurality of terminal devices performs resource multiplexing on an allocated channel resource occupied by the reference terminal device, and duration corresponding to the time-frequency resource is preset duration of a longest channel occupancy time; and determining, by the base station, the longest channel occupancy time by using a channel time occupied by the reference terminal device.

It should be noted that the preset duration of the longest channel occupancy time may be regulated by laws, for example, 4 ms in Japan, or 10 ms in Europe.

Figure 2:
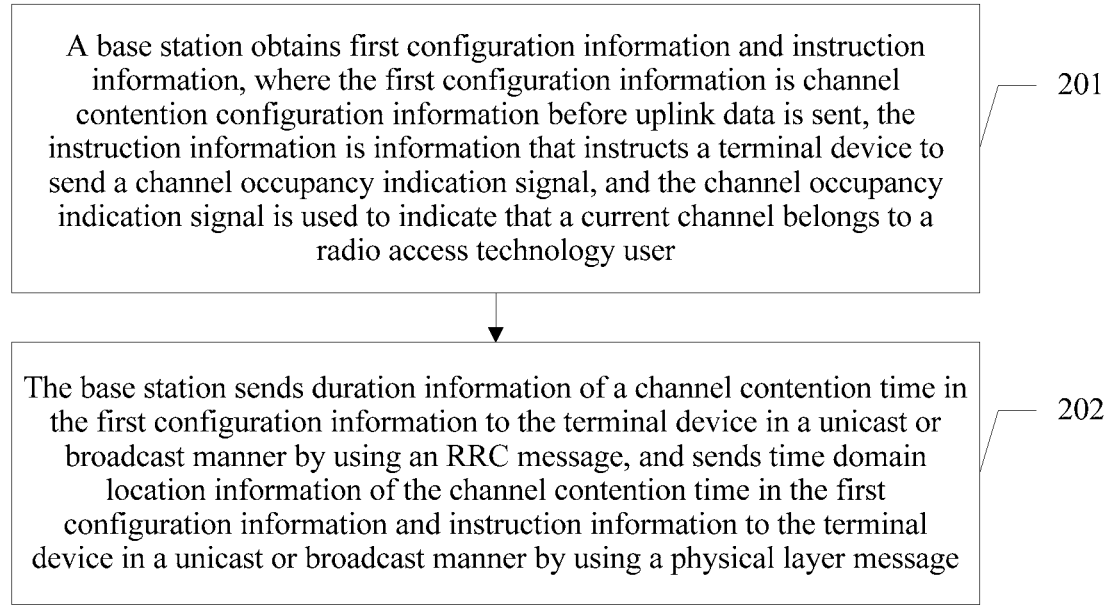
FIG. 2 is a schematic diagram of another embodiment of an uplink transmission method according to embodiments of the present invention.

For ease of understanding, the following describes in detail the uplink transmission method in the embodiments of the present invention. Referring to FIG. 2, another embodiment of the uplink transmission method in the embodiments of the present invention includes the following steps.

201. A base station obtains first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user.

In this embodiment, the first configuration information may be configured by the base station, or may be specified by a communications protocol. The instruction information may be instructed by the base station, or may be specified by a communications protocol. The terminal device may include one terminal device or a plurality of terminal devices in a cell served by the base station, or may include one terminal device or a plurality of terminal devices in a terminal device list, or may include all terminal devices in a terminal device list. The base station may select one or more terminal devices to send the channel occupancy indication signal.

The terminal device may send the channel occupancy indication signal in a full bandwidth manner, or the terminal device may send the channel occupancy indication signal in a fractional bandwidth manner.

The first configuration information includes duration information and time domain location information of a channel contention time. The instruction information includes information that instructs the base station to select the terminal device from the cell served by the base station as a terminal device that sends the channel occupancy indication signal. Second configuration information described below includes a reference signal sequence and bandwidth information of the channel occupancy indication signal.

It should be noted that duration in the duration information of the channel contention time may be a length of one symbol, or may be a length of a plurality of symbols, or may be less than a length of one symbol. Generally, the duration in the duration information of the channel contention time needs to be greater than shortest LBT duration and less than duration of one timeslot. In addition, in some embodiments of the present invention, the second configuration information may further include at least one of cyclic shift information of the reference signal sequence or frequency resource information of the channel occupancy indication signal. In addition, the symbol may be an OFDM symbol.

The time domain location information of the channel contention time is start location information of the channel contention time.

202. The base station sends duration information of a channel contention time in the first configuration information to the terminal device in a unicast or broadcast manner by using an RRC message, and sends time domain location information of the channel contention time in the first configuration information and the instruction information to the terminal device in a unicast or broadcast manner by using a physical layer message.

Optionally, the duration information and/or the time domain location information of the channel contention time in the first configuration information may be specified by a communications protocol. Specifically, if the communications protocol specifies the time domain location information of the channel contention time, the base station sends the duration information of the channel contention time in the first configuration information to the terminal device in a unicast or broadcast manner by using the physical layer message or the RRC message.

In this embodiment, a time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

It should be noted as follows: It is assumed that the uplink data includes uplink data 1 and uplink data 2, a time domain location of an uplink resource carrying the uplink data 1 is in a subframe 1, a time domain location of an uplink resource carrying the uplink data 2 is in a subframe 2, a time domain location of the subframe 1 is adjacent to a time domain location of the subframe 2, and the time domain location of the subframe 1 is before the time domain location of the subframe 2. In this case, that a time domain location of the channel contention time is adjacent to a time domain location of an uplink resource carrying the uplink data is that the time domain location of the channel contention time is adjacent to the time domain location of the uplink resource carrying the uplink data 1; and that a subframe for the channel contention time is adjacent to a subframe for an uplink resource carrying the uplink data is that the subframe for the channel contention time is adjacent to the subframe for the uplink resource carrying the uplink data 2.

It should be noted that the uplink resource carrying the uplink data occupies duration of one or more symbols.

It should be noted that step 202 in this embodiment may be alternatively as follows: The base station sends duration information and time domain location information of a channel contention time in the first configuration information to the terminal device in a unicast or broadcast manner by using an RRC message, and sends the instruction information to the terminal device in a unicast or broadcast manner by using a physical layer message.

In this embodiment, the uplink data may be uplink data sent by a plurality of terminal devices, so that uplink multiuser scheduling is implemented. The channel occupancy indication signal is used to indicate that the current channel belongs to the radio access technology user, and a receiver of the channel occupancy indication signal performs resource multiplexing, so that multiuser resource multiplexing is implemented. Duration of a time configured in the channel contention configuration information may be far less than duration of one timeslot, so that resources are saved.

In addition, the method for sending the first configuration information and the instruction information is provided, so that the technical solutions of the present invention are improved.

In some embodiments of the present invention, the base station may send the first configuration information and the instruction information by using regulations in a communications protocol.

In addition, a relationship between the time domain location of the channel contention time and the time domain location of the uplink resource carrying the uplink data may be as follows: The time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes. Further, in a time domain, the uplink resource carrying the uplink data occupies duration of one or more symbols.

In addition, based on an uplink channel frame structure in an existing protocol, PUCCH channels are distributed on both sides of a frequency domain of a PUSCH channel, PRACH channels are distributed near a center frequency, SRS resources are distributed on the PUSCH channel, and the SRS resources are located in a last symbol of a subframe. If the uplink data is PUCCH data, and the PUCCH channels are distributed on both sides of the frequency domain of the PUSCH channel and occupy a relatively small bandwidth in the frequency domain, the prior art cannot ensure that a channel is not occupied by another terminal device. For example, the channel is occupied by an IEEE 802.11n/11ac user. Consequently, accurate receiving of the PUCCH data is affected. In a frame structure of the PUCCH channel, if the PUCCH channel occupies a relatively small time resource in the time domain, and occupies a relatively large bandwidth or even all bandwidths in the frequency domain, it can be ensured that a channel is not occupied by another terminal device. Similarly, if the uplink data is PRACH data, and the PRACH channels are distributed near a center frequency and occupy a relatively small bandwidth in the frequency domain, the prior art cannot ensure that a channel is not occupied by another terminal device, either. For example, the channel is occupied by an IEEE 802.11n/11ac user. Consequently, accurate receiving of the PRACH data is affected. In a frame structure of the PRACH channel, if the PRACH channel occupies a relatively small time resource in the time domain, and occupies a relatively large bandwidth or even all bandwidths in the frequency domain, it can be ensured that a channel is not occupied by another terminal device.

In this embodiment of the present invention, the terminal device sends the channel occupancy indication signal, so that the IEEE 802.11n/11ac user is prevented from occupying the channel, and the PUCCH data and the PRACH data can be accurately received. A waste of resources in the prior art can be reduced by using the duration information and the time domain location information of the channel contention time in the first configuration information, for example, the duration of the duration information of the channel contention time is set to one symbol. In addition, in this embodiment of the present invention, the PUCCH channel of a large bandwidth and the SRS resource location may be distributed on a last symbol of the subframe, or may be distributed on a first symbol of the subframe, or may be distributed on any symbol. This is specifically dependent on configuration of the base station or regulation of a communications protocol.

Optionally, in some embodiments of the present invention, the method further includes:

sending, by the base station, second configuration information to the terminal device, where the second configuration information is configuration information of the channel occupancy indication signal.

The sending, by the base station, second configuration information to the terminal device is specifically as follows:

sending, by the base station, the second configuration information to the terminal device in a unicast manner by using a radio resource control layer RRC message, or sending, by the base station, the second configuration information to the terminal device in a broadcast manner by using a radio resource control layer RRC message.

It should be noted that if the terminal device includes some terminal devices in a terminal device list, the base station sends the second configuration information to these terminal devices in a unicast or broadcast manner by using an RRC message; or if the terminal device includes all terminal devices in a terminal device list, the base station sends the second configuration information to all the terminal devices in a unicast or broadcast manner by using an RRC message.

Optionally, the base station may send a part of information in the second configuration information to the terminal device in a broadcast manner by using the radio resource control layer RRC message, and send the other part of information in the second configuration information to the terminal device in a unicast manner by the radio resource control layer RRC message. For example, the base station sends the reference signal sequence of the channel occupancy indication signal in the second configuration information to the terminal device in a broadcast manner by using the radio resource control layer RRC message, and sends at least one of cyclic shift information of the reference signal sequence, bandwidth information, or frequency resource information of the channel occupancy indication signal in the second configuration information to the terminal device in a unicast manner by using the radio resource control layer RRC message.

For ease of understanding the technical solutions of the present invention, the uplink transmission method in the present invention is described below by using an actual application scenario.

The base station allocates an uplink resource of a first subframe to a terminal device A and a terminal device C, and allocates an uplink resource of a second subframe to the terminal device A, a terminal device B, and a terminal device D. A time domain location of the first subframe is adjacent to a time domain location of the second subframe, and the time domain location of the first subframe is before the time domain location of the second subframe. The terminal device A and the terminal device B perform multiuser spatial multiplexing on the second subframe. A channel occupancy indication signal is sent by the terminal device A and/or the terminal device C on a last symbol of the first subframe, so that the terminal device B and the terminal device D identify, by reading the channel occupancy indication signal, that the current channel belongs to the radio access technology user, and then send data by resource multiplexing.

Figure 3:
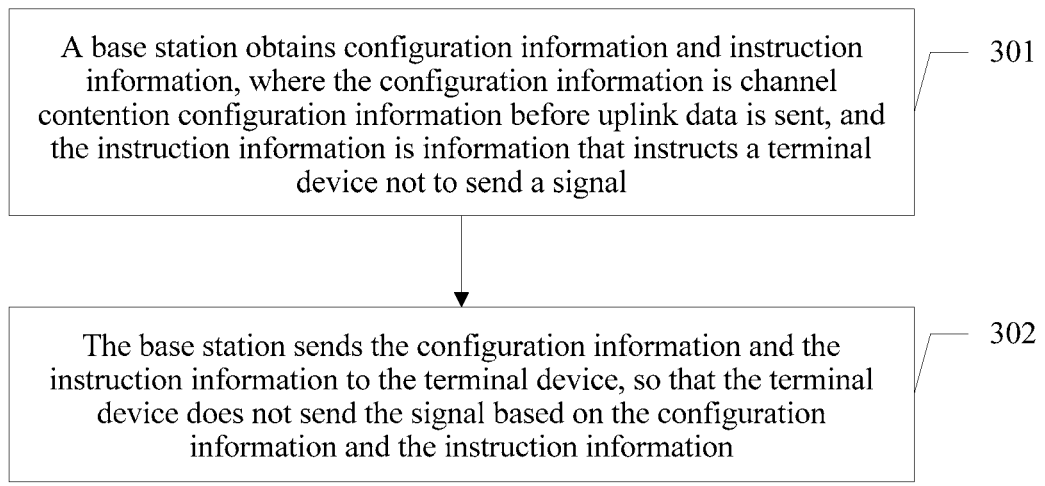
FIG. 3 is a schematic diagram of another embodiment of an uplink transmission method according to embodiments of the present invention.

The present invention further provides another uplink transmission method. Referring to FIG. 3, another embodiment of the uplink transmission method in the embodiments of the present invention includes the following steps.

301. A base station obtains configuration information and instruction information, where the configuration information is channel contention configuration information before uplink data is sent, and the instruction information is information that instructs a terminal device not to send a signal.

In this embodiment, the configuration information may be configured by the base station, or may be specified by a communications protocol. The instruction information may be instructed by the base station, or may be specified by a communications protocol.

302. The base station sends the configuration information and the instruction information to the terminal device, so that the terminal device does not send the signal based on the configuration information and the instruction information.

In this embodiment, the terminal device does not send the signal based on the configuration information and the instruction information, so that a sender of the uplink data has an enough time to complete an LBT process, and a receiver of the uplink data accurately receives the uplink data.

The following uses an example for description.

The base station allocates an uplink resource of a first subframe to a terminal device A and a terminal device C, and allocates an uplink resource of a second subframe to the terminal device A, a terminal device B, and a terminal device D. A time domain location of the first subframe is adjacent to a time domain location of the second subframe, and the time domain location of the first subframe is before the time domain location of the second subframe. The terminal device A and the terminal device B perform multiuser spatial multiplexing on the second subframe, and the terminal device does not send any signal on a last symbol of the first subframe, so that the terminal device B and the terminal device D can successfully preempt a right of use of a channel.

The uplink transmission method in the embodiments of the present invention is described above from a perspective of the base station, and the uplink transmission method in the embodiments of the present invention is described below from a perspective of a terminal device.

Figure 4:
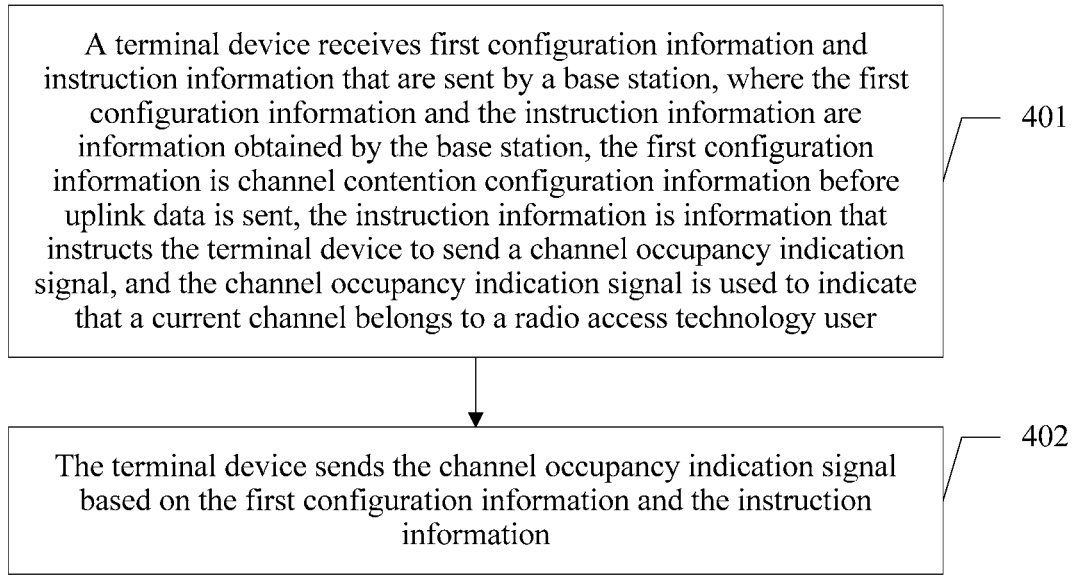
FIG. 4 is a schematic diagram of another embodiment of an uplink transmission method according to embodiments of the present invention.

Referring to FIG. 4, another embodiment of an uplink transmission method in the embodiments of the present invention includes the following steps.

401. A terminal device receives first configuration information and instruction information that are sent by a base station, where the first configuration information and the instruction information are information obtained by the base station, the first configuration information is channel contention configuration information before uplink data is sent, the instruction information is information that instructs the terminal device to send a channel occupancy indication signal, and the channel occupancy indication signal is used to indicate that a current channel belongs to a radio access technology user.

In this embodiment, the first configuration information may be configured by the base station, or may be specified by a communications protocol. The instruction information may be instructed by the base station, or may be specified by a communications protocol. The terminal device may include one terminal device or a plurality of terminal devices in a cell served by the base station, or may include one terminal device or a plurality of terminal devices in a terminal device list, or may include all terminal devices in the terminal device list. The base station may select one or more terminal devices to send the channel occupancy indication signal.

402. The terminal device sends the channel occupancy indication signal based on the first configuration information and the instruction information.

In this embodiment, the terminal device may determine, based on duration information and time domain location information of a channel contention time in the first configuration information, duration in the duration information and a start location of a time domain location, and the terminal device sends the channel occupancy indication signal based on the instruction information in duration corresponding to the start location.

In this embodiment, the terminal device sends the channel occupancy indication signal to indicate that the current channel belongs to an LTE user, so that an IEEE 802.11n/11ac user is prevented from preempting a right of use of the channel.

Optionally, in some embodiments of the present invention, the method further includes:

receiving, by the terminal device, second configuration information sent by the base station, where the second configuration information is configuration information of the channel occupancy indication signal.

Further, optionally, in some embodiments of the present invention, the receiving, by the terminal device, second configuration information sent by the base station is specifically as follows:

receiving, by the terminal device, the second configuration information sent by the base station in a unicast manner by using a radio resource control layer RRC message; or receiving, by the terminal device, the second configuration information sent by the base station in a broadcast manner by using a radio resource control layer RRC message.

It should be noted that the first configuration information includes duration information and time domain location information of a channel contention time, the instruction information includes information that instructs the base station to select the terminal device from the cell served by the base station as a terminal device that sends the channel occupancy indication signal, and the second configuration information includes reference signal sequence information and bandwidth information of the channel occupancy indication signal.

Optionally, in some embodiments of the present invention, that a terminal device receives first configuration information and instruction information that are sent by a base station includes:

receiving, by the terminal device, duration information that is of a channel contention time in the first configuration information and that is sent by the base station in a unicast or broadcast manner by using an RRC message, and receiving time domain location information of the channel contention time in the first configuration information and the instruction information that are sent by the base station in a unicast or broadcast manner by using a physical layer message; or receiving, by the terminal device, duration information and time domain location information that are of a channel contention time in the first configuration information and that are sent by the base station in a unicast or broadcast manner by using an RRC message, and receiving the instruction information sent by the base station in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

Further, the time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes. In addition, in a time domain, the uplink resource carrying the uplink data occupies duration of one or more symbols.

Figure 5:
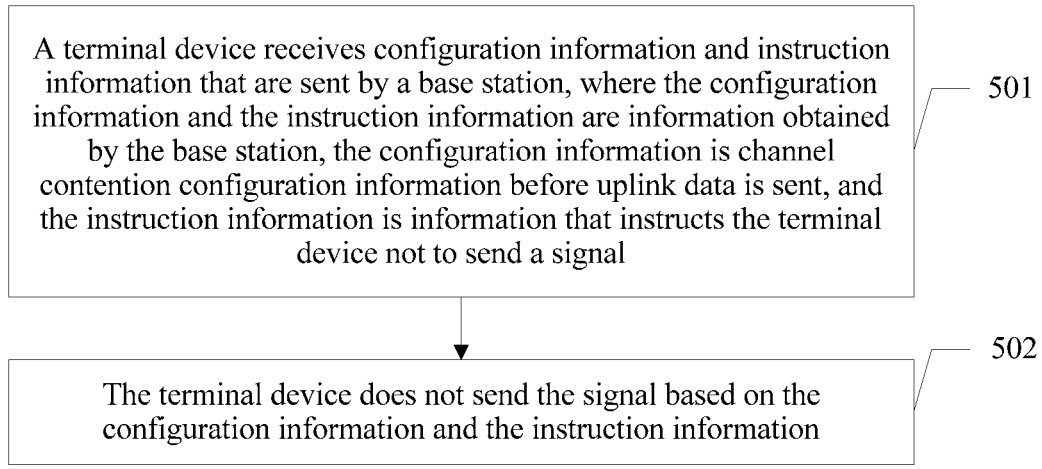
FIG. 5 is a schematic diagram of another embodiment of an uplink transmission method according to embodiments of the present invention.

Referring to FIG. 5, another embodiment of an uplink transmission method in the embodiments of the present invention includes the following steps.

501. A terminal device receives configuration information and instruction information that are sent by a base station, where the configuration information and the instruction information are information obtained by the base station, the configuration information is channel contention configuration information before uplink data is sent, and the instruction information is information that instructs a terminal device not to send a signal.

In this embodiment, the configuration information may be configured by the base station, or may be specified by a communications protocol; the instruction information may be instructed by the base station, or may be specified by a communications protocol.

502. The terminal device does not send the signal based on the configuration information and the instruction information.

In this embodiment, the terminal device may determine, based on duration information and time domain location information of a channel contention time in the configuration information, duration in the duration information and a start location of a time domain location, and the terminal device does not send the signal based on the instruction information in duration corresponding to the start location.

In this embodiment, the terminal device does not send the signal based on the configuration information and the instruction information, so that a sender of the uplink data has an enough time to complete an LBT process, and a receiver of the uplink data accurately receives the uplink data.

Figure 6:
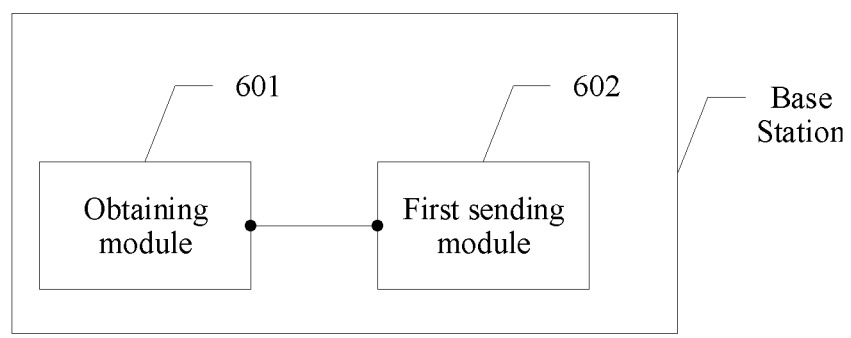
FIG. 6 is a schematic diagram of an embodiment of a base station according to embodiments of the present invention.

The following describes a base station in the embodiments of the present invention. Referring to FIG. 6, an embodiment of the base station in the embodiments of the present invention includes:

an obtaining module 601, configured to obtain first configuration information and instruction information, where the first configuration information is channel contention configuration information before uplink data is sent, the instruction information is information that instructs a terminal device to send a channel occupancy indication signal, and the channel occupancy indication signal is used to indicate that a current channel belongs to a radio access technology user; and a first sending module 602, configured to send the first configuration information and the instruction information to the terminal device, so that the terminal device sends the channel occupancy indication signal based on the first configuration information and the instruction information.

In this embodiment, the uplink data may be uplink data sent by a plurality of terminal devices, so that uplink multiuser scheduling is implemented. The channel occupancy indication signal is used to indicate that the current channel belongs to the radio access technology user, and a receiver of the channel occupancy indication signal performs resource multiplexing, so that multiuser resource multiplexing is implemented. Duration of a time configured in the channel contention configuration information may be far less than duration of one timeslot, so that resources are saved.

Figure 7:
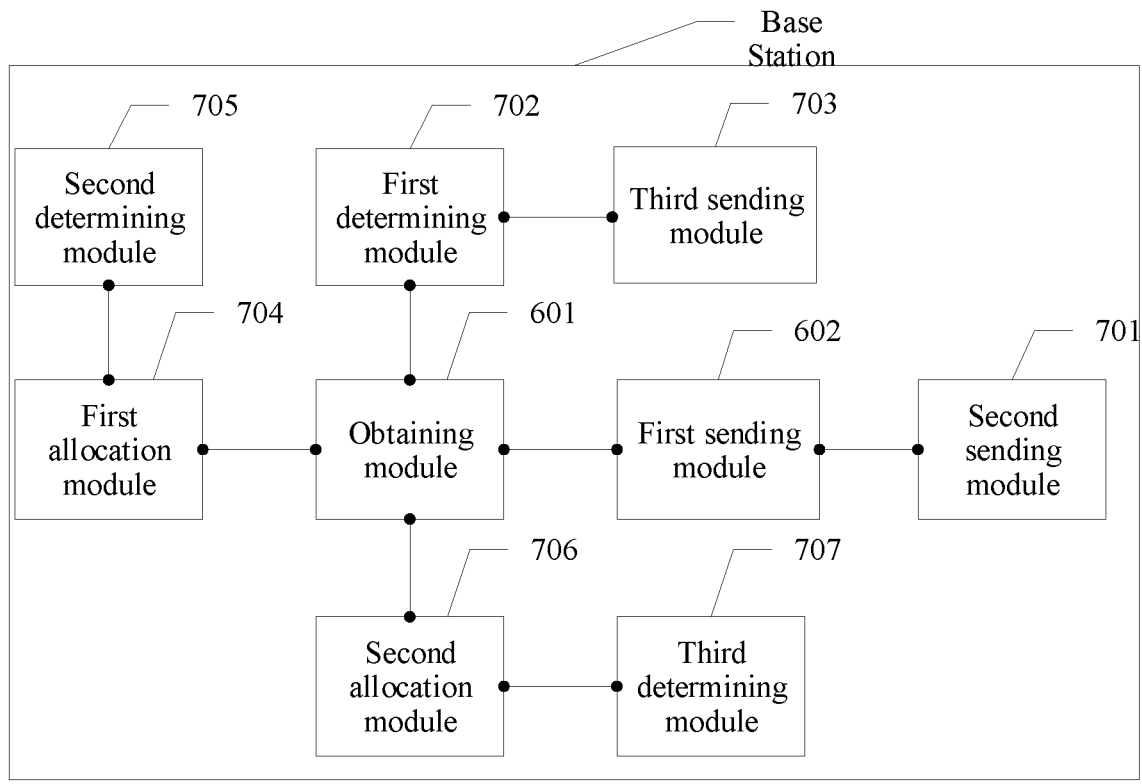
FIG. 7 is a schematic diagram of another embodiment of a base station according to embodiments of the present invention.

Referring to FIG. 7, the base station further includes:

a second sending module 701, configured to send second configuration information to the terminal device, where the second configuration information is configuration information of the channel occupancy indication signal.

The second sending module 701 is specifically configured to send the second configuration information to the terminal device in a unicast manner by using a radio resource control layer RRC message, or send the second configuration information to the terminal device in a broadcast manner by using a radio resource control layer RRC message.

The first configuration information includes duration information and time domain location information of a channel contention time. The instruction information includes information that instructs the base station to select the terminal device from a cell served by the base station as a terminal device that sends the channel occupancy indication signal. The second configuration information includes reference signal sequence information and bandwidth information of the channel occupancy indication signal.

The first sending module 602 is specifically configured to send duration information of a channel contention time in the first configuration information to the terminal device in a unicast or broadcast manner by using an RRC message, and send time domain location information of the channel contention time in the first configuration information and the instruction information to the terminal device in a unicast or broadcast manner by using a physical layer message; or send duration information and time domain location information of a channel contention time in the first configuration information to the terminal device in a unicast or broadcast manner by using an RRC message, and send the instruction information to the terminal device in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

Further, the time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes. In a time domain, the uplink resource carrying the uplink data occupies duration of one or more symbols.

The base station further includes:

a first determining module 702, configured to determine a receiver of the channel occupancy indication signal; and a third sending module 703, configured to send a notification message to the receiver of the channel occupancy indication signal, where the notification message includes at least one of information about a distance between the terminal device and the receiver, information about coordinates of a location of the terminal device, or timing advance TA information.

The base station further includes:

a first allocation module 704, configured to allocate a time-frequency resource to a plurality of terminal devices, where duration corresponding to the time-frequency resource is preset duration of a longest channel occupancy time; and a second determining module 705, configured to determine the longest channel occupancy time by using an allocated channel time occupied by the plurality of terminal devices; or a second allocation module 706, configured to allocate a time-frequency resource to a reference terminal device in a plurality of terminal devices, where a terminal device other than the reference terminal device in the plurality of terminal devices performs resource multiplexing on an allocated channel resource occupied by the reference terminal device, and duration corresponding to the time-frequency resource is preset duration of a longest channel occupancy time; and a third determining module 707, configured to determine the longest channel occupancy time by using a channel time occupied by the reference terminal device.

Figure 8:
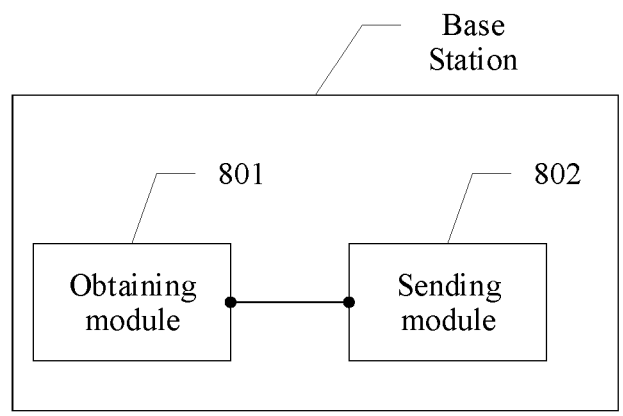
FIG. 8 is a schematic diagram of another embodiment of a base station according to embodiments of the present invention.

Referring to FIG. 8, another embodiment of a base station in the embodiments of the present invention includes:

an obtaining module 801, configured to obtain configuration information and instruction information, where the configuration information is contention configuration information before uplink data is sent, and the instruction information is information that instructs a terminal device not to send a signal; and a sending module 802, configured to send the configuration information and the instruction information to the terminal device, so that the terminal device does not send the signal based on the configuration information and the instruction information.

In this embodiment, the sending module 802 does not send the signal based on the configuration information and the instruction information, so that a sender of the uplink data has an enough time to complete an LBT process, and a receiver of the uplink data accurately receives the uplink data.

Figure 9:
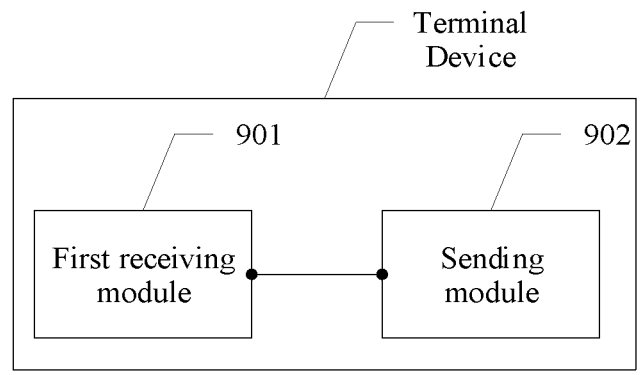
FIG. 9 is a schematic diagram of an embodiment of a terminal device according to an embodiment of the present invention.

The following describes a terminal device in the embodiments of the present invention. Referring to FIG. 9, an embodiment of the terminal device in the embodiments of the present invention includes:

a first receiving module 901, configured to receive first configuration information and instruction information that are sent by a base station, where the first configuration information and the instruction information are information obtained by the base station, the first configuration information is channel contention configuration information before uplink data is sent, the instruction information is information that instructs the terminal device to send a channel occupancy indication signal, and the channel occupancy indication signal is used to indicate that a current channel belongs to a radio access technology user; and a sending module 902, configured to send the channel occupancy indication signal based on the first configuration information and the instruction information.

In this embodiment, the sending module 902 sends the channel occupancy indication signal to indicate that the current channel belongs to the radio access technology user, so that an IEEE 802.11n/11ac user is prevented from preempting a right of use of a channel.

Figure 10:
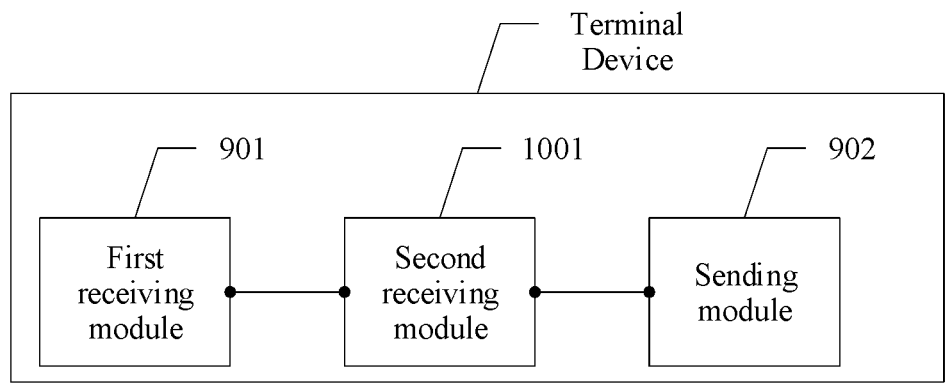
FIG. 10 is a schematic diagram of another embodiment of a terminal device according to an embodiment of the present invention.

Referring to FIG. 10, the terminal device further includes:

a second receiving module 1001, configured to receive second configuration information sent by the base station, where the second configuration information is configuration information of the channel occupancy indication signal.

The second receiving module 1001 is specifically configured to receive the second configuration information sent by the base station in a unicast manner by using a radio resource control layer RRC message, or receive the second configuration information sent by the base station in a broadcast manner by using a radio resource control layer RRC message.

The first configuration information includes duration information and time domain location information of a channel contention time. The instruction information includes information that instructs the base station to select the terminal device from a cell served by the base station as a terminal device that sends the channel occupancy indication signal. The second configuration information includes reference signal sequence information and bandwidth information of the channel occupancy indication signal.

The first receiving module 901 is specifically configured to: receive duration information that is of a channel contention time in the first configuration information and that is sent by the base station in a unicast or broadcast manner by using an RRC message, and receive time domain location information of the channel contention time in the first configuration information and the instruction information that are sent by the base station in a unicast or broadcast manner by using a physical layer message; or receive duration information and time domain location information that are of a channel contention time in the first configuration information and that are sent by the base station in a unicast or broadcast manner by using an RRC message, and receive the instruction information sent by the base station in a unicast or broadcast manner by using a physical layer message.

A time domain location of the channel contention time is adjacent to a time domain location of an uplink resource carrying the uplink data, and the time domain location of the channel contention time is before the time domain location of the uplink resource; or a subframe for the channel contention time is adjacent to a subframe for an uplink resource carrying the uplink data, and a time domain location of the channel contention time is before a time domain location of the uplink resource.

Further, the time domain location of the channel contention time and the time domain location of the uplink resource carrying the uplink data are in a same subframe; or the time domain location of the channel contention time and the time domain location of the uplink resource carrying the uplink data are in different subframes; or the time domain location of the channel contention time crosses two adjacent subframes, and the time domain location of the uplink resource carrying the uplink data is in one of the two adjacent subframes. In a time domain, the uplink resource carrying the uplink data occupies duration of one or more symbols.

Figure 11:
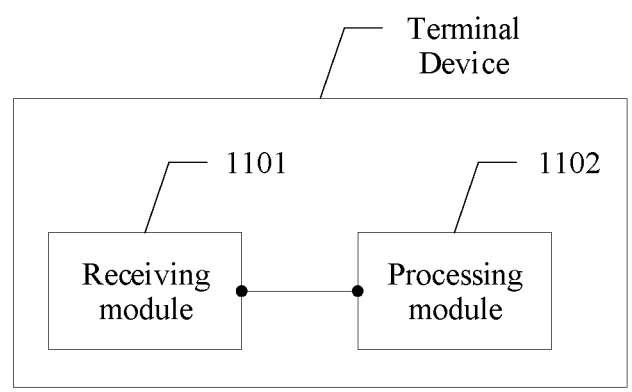
FIG. 11 is a schematic diagram of another embodiment of a terminal device according to an embodiment of the present invention.

Referring to FIG. 11, another embodiment of a terminal device in the embodiments of the present invention includes:

a receiving module 1101, configured to receive configuration information and instruction information that are sent by a base station, where the configuration information and the instruction information are information obtained by the base station, the configuration information is channel contention configuration information before uplink data is sent, and the instruction information is information that instructs a terminal device not to send a signal; and a processing module 1102, configured to skip sending the signal based on the configuration information and the instruction information.

In this embodiment, the processing module 1101 does not send the signal based on the configuration information and the instruction information, so that a sender of the uplink data has an enough time to complete an LBT process, and a receiver of the uplink data accurately receives the uplink data.

Figure 12:
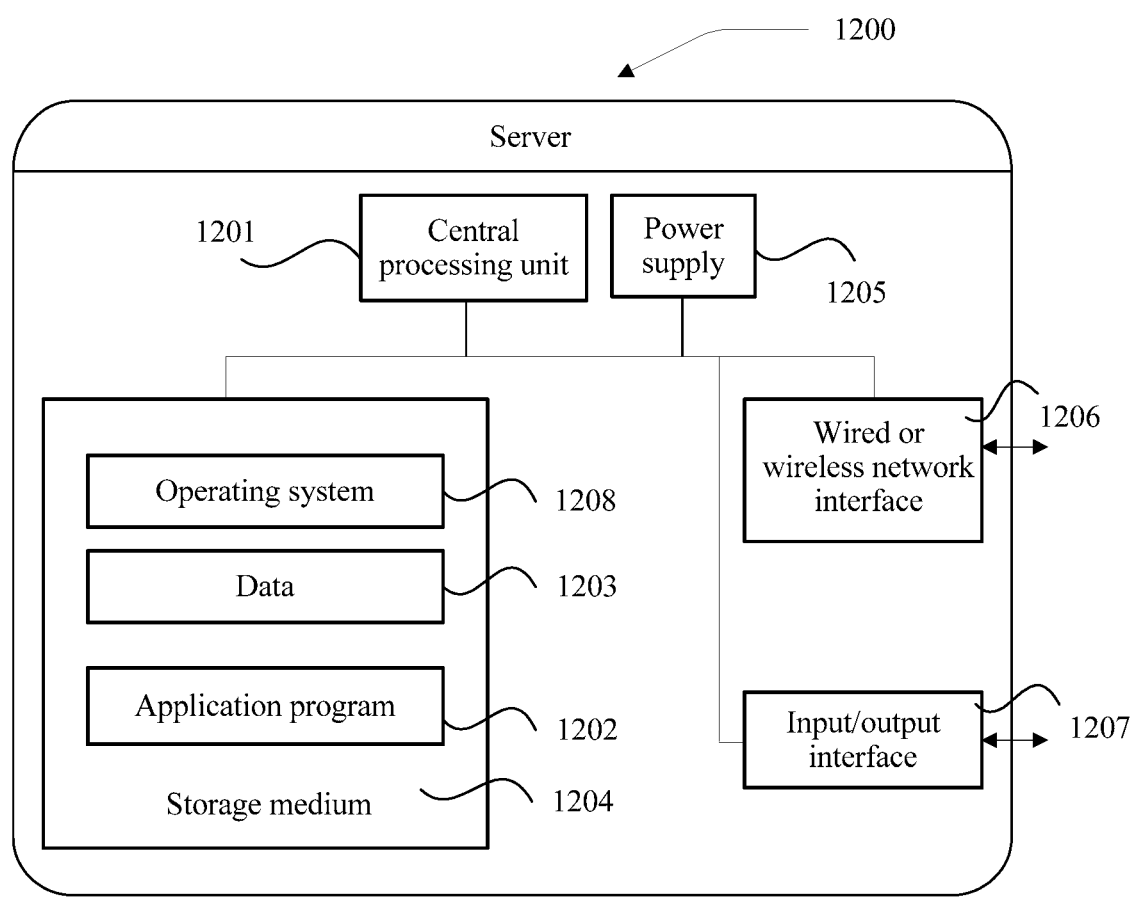
FIG. 12 is a schematic diagram of an embodiment of a server according to embodiments of the present invention.

The embodiments of the present invention further provide a server. Referring to FIG. 12, an embodiment of the server in the embodiments of the present invention includes:

FIG. 12 is a schematic structural diagram of the server according to this embodiment of the present invention. The server 1200 may vary greatly because of a difference in configuration or performance, and may include one or more central processing units (central processing unit, CPU) 1201 (for example, one or more processors), and one or more storage media 1204 (for example, one or more mass storage devices) that store an application program 1202 or data 1203. The storage medium 1204 may be a transient storage or a persistent storage. A program stored in the storage medium 1204 may include one or more modules (not shown in FIG. 12), and each module may include a series of instruction operations to be performed on a switch. Further, the central processing unit 1201 may be configured to communicate with the storage medium 1204 to perform, on the server 1200, a series of instruction operations in the storage medium 1204.

The server 1200 may further include one or more power supplies 1205, one or more wired or wireless network interfaces 1206, one or more input/output interfaces 1207, and/or one or more operating systems 1208, such as Windows Server™, Mac OS X™, Unix™, Linux™, or FreeBSD™.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An uplink transmission method, wherein the method comprises:

obtaining, by a base station, first configuration information and instruction information, wherein the first configuration information includes channel contention configuration information before uplink data is sent, the channel contention configuration information specifying at least one manner by which a terminal device contends for a current channel, wherein the first configuration information comprises duration information and time domain location information of a channel contention time, wherein the time domain location of the channel contention time is located in a first subframe and an uplink resource carrying the uplink data is located in a second subframe that is next adjacent to the first subframe, and the instruction information includes information that instructs the terminal device to send a channel occupancy indication signal on a last symbol of the first subframe, the channel occupancy indication signal indicating that a current channel belongs to a radio access technology user; and sending, by the base station, the first configuration information and the instruction information to the terminal device, so that the terminal device sends the channel occupancy indication signal based on the first configuration information and the instruction information; and, wherein the method further comprises sending, by the base station, second configuration information to the terminal device, wherein the second configuration information is configuration information of the channel occupancy indication signal, wherein the instruction information comprises information that instructs the base station to select the terminal device from a cell served by the base station as a terminal device that sends the channel occupancy indication signal, and the second configuration information comprises reference signal sequence information and bandwidth information of the channel occupancy indication signal; and sending, by the base station, duration information of a channel contention time in the first configuration information to the terminal device in a unicast or broadcast manner by using an RRC message, and send time domain location information of the channel contention time in the first configuration information and the instruction information to the terminal device in a unicast or broadcast manner by using a physical layer message; or sending, by the base station, duration information and time domain location information of a channel contention time in the first configuration information to the terminal device in a unicast or broadcast manner by using the RRC message, and send the instruction information to the terminal device in a unicast or broadcast manner by using a physical layer message.

2. The method according to claim 1, wherein the method further comprises:
sending, by the base station, second configuration information to the terminal device, wherein the second configuration information is configuration information of the channel occupancy indication signal.

3. The method according to claim 2, wherein the sending, by the base station, second configuration information to the terminal device comprises:
sending, by the base station, the second configuration information to the terminal device in a unicast manner by using a radio resource control layer RRC message; or
sending, by the base station, the second configuration information to the terminal device in a broadcast manner by using a radio resource control layer RRC message.

4. The method according to claim 2, wherein the instruction information comprises information that instructs the base station to select the terminal device from a cell served by the base station as a terminal device that sends the channel occupancy indication signal, and the second configuration information comprises reference signal sequence information and bandwidth information of the channel occupancy indication signal.

5. The method according to claim 1, wherein after sending, by the base station, the first configuration information and the instruction information to the terminal device, the method comprises:
determining, by the base station, a receiver of the channel occupancy indication signal; and
sending, by the base station, a notification message to the receiver of the channel occupancy indication signal, wherein the notification message comprises at least one of information about a distance between the terminal device and the receiver, information about coordinates of a location of the terminal device, or timing advance (TA) information.

6. A base station, wherein the base station comprises:
a receiver, configured to obtain first configuration information and instruction information, wherein
the first configuration information includes channel contention configuration information before uplink data is sent, the channel contention configuration information specifying at least one manner by which a terminal device contends for a current channel, wherein the first configuration information comprises duration information and time domain location information of a channel contention time, wherein the time domain location of the channel contention time is located in a first subframe and an uplink resource carrying the uplink data is located in a second subframe that is next adjacent to the first subframe, and
the instruction information includes information that instructs the terminal device to send a channel occupancy indication signal on a last symbol of the first subframe, the channel occupancy indication signal indicating that a current channel belongs to a radio access technology user; and
a transmitter, configured to send the first configuration information and the instruction information to the terminal device, so that the terminal device sends the channel occupancy indication signal based on the first configuration information and the instruction information; and, wherein
the transmitter is further configured to:
send second configuration information to the terminal device, wherein the second configuration information is configuration information of the channel occupancy indication signal, wherein the instruction information comprises information that instructs the base station to select the terminal device from a cell served by the base station as a terminal device that sends the channel occupancy indication signal, and the second configuration information comprises reference signal sequence information and bandwidth information of the channel occupancy indication signal; and
send duration information of a channel contention time in the first configuration information to the terminal device in a unicast or broadcast manner by using an RRC message, and send time domain location information of the channel contention time in the first configuration information and the instruction information to the terminal device in a unicast or broadcast manner by using a physical layer message; or send duration information and time domain location information of a channel contention time in the first configuration information to the terminal device in a unicast or broadcast manner by using the RRC message, and send the instruction information to the terminal device in a unicast or broadcast manner by using a physical layer message.

7. The base station according to claim 6, wherein the transmitter is further configured to send the second configuration information to the terminal device in a unicast manner by using a radio resource control layer RRC message, or send the second configuration information to the terminal device in a broadcast manner by using a radio resource control layer RRC message.

8. The base station according to claim 6, wherein
the base station further comprises a processor, configured to determine a receiver of the channel occupancy indication signal; and
the transmitter is further configured to send a notification message to the receiver of the channel occupancy indication signal, wherein the notification message comprises at least one of information about a distance between the terminal device and the receiver, information about coordinates of a location of the terminal device, or timing advance TA information.

9. A terminal device, wherein the terminal device comprises:
a receiver, configured to receive first configuration information and instruction information that are sent by a base station, wherein the first configuration information and the instruction information are information obtained by the base station, the first configuration information includes channel contention configuration information before uplink data is sent, the channel contention configuration information specifying at least one manner by which a terminal device contends for a current channel, wherein the first configuration information comprises duration information and time domain location information of a channel contention time, wherein the time domain location of the channel contention time is located in a first subframe and an uplink resource carrying the uplink data is located in a second subframe that is next adjacent to the first subframe, and the instruction information includes information that instructs the terminal device to send a channel occupancy indication signal on a last symbol of the first subframe, the channel occupancy indication signal indicating that a current channel belongs to a radio access technology user; and a transmitter, configured to:

send the channel occupancy indication signal based on the first configuration information and the instruction information;

send second configuration information to the terminal device, wherein the second configuration information is configuration information of the channel occupancy indication signal, wherein the instruction information comprises information that instructs the base station to select the terminal device from a cell served by the base station as a terminal device that sends the channel occupancy indication signal, and the second configuration information comprises reference signal sequence information and bandwidth information of the channel occupancy indication signal; and send duration information of a channel contention time in the first configuration information to the terminal device in a unicast or broadcast manner by using an RRC message, and send time domain location information of the channel contention time in the first configuration information and the instruction information to the terminal device in a unicast or broadcast manner by using a physical layer message; or send duration information and time domain location information of a channel contention time in the first configuration information to the terminal device in a unicast or broadcast manner by using the RRC message, and send the instruction information to the terminal device in a unicast or broadcast manner by using a physical layer message.

10. The terminal device according to claim 9, wherein the transmitter is further configured to receive second configuration information sent by the base station, wherein the second configuration information is configuration information of the channel occupancy indication signal.

11. The terminal device according to claim 10, wherein the receiver is further configured to receive the second configuration information sent by the base station in a unicast manner by using a radio resource control layer RRC message, or receive the second configuration information sent by the base station in a broadcast manner by using a radio resource control layer RRC message.

12. The terminal device according to claim 10, wherein the instruction information comprises information that instructs the base station to select the terminal device from a cell served by the base station as a terminal device that sends the channel occupancy indication signal, and the second configuration information comprises reference signal sequence information and bandwidth information of the channel occupancy indication signal.

* * * * *